United States Patent
Nagatani (10) Patent No.: US 7,194,476 B2
(45) Date of Patent: Mar. 20, 2007

(54) IMAGE PROCESSING METHOD, PROGRAM THEREOF AND IMAGE PROCESSING APPARATUS

(75) Inventor: Masahiro Nagatani, Kanagawa (JP)

(73) Assignee: Canon Kabushiki Kaisha, Tokyo (JP)

( * ) Notice: Subject to any disclaimer, the term of this patent is extended or adjusted under 35 U.S.C. 154(b) by 414 days.

(21) Appl. No.: 10/094,715

(22) Filed: Mar. 12, 2002

(65) Prior Publication Data

US 2002/0147723 A1 Oct. 10, 2002

(30) Foreign Application Priority Data

Mar. 14, 2001 (JP) ............................ 2001-071961

(51) Int. Cl.
*G06F 17/00* (2006.01)
(52) U.S. Cl. .................. 707/102; 707/104.1; 382/162
(58) Field of Classification Search .............. 707/1–10, 707/100–104.1, 200–206; 382/276–308, 382/162; 358/1.1–3.32
See application file for complete search history.

(56) References Cited

U.S. PATENT DOCUMENTS 5,937,103 A * 8/1999 Oh et al. .................... 382/276
6,313,857 B1 * 11/2001 Shimizu ...................... 347/188
6,428,671 B1 * 8/2002 Sogo et al. .................. 204/623
6,564,369 B1 * 5/2003 Hove et al. .................. 717/121
6,707,932 B1 * 3/2004 Chakraborty ............... 382/113
6,757,076 B1 * 6/2004 Mestha et al. ............... 358/1.9
2002/0067504 A1 * 6/2002 Salgado et al. ............ 358/1.15

* cited by examiner

*Primary Examiner*—Isaac Woo
(74) *Attorney, Agent, or Firm*—Fitzpatrick, Cella, Harper & Scinto (57) ABSTRACT

The execution of a calibration process according to a characteristic of an image formation unit is properly controlled. To do so, it is provided an image processing method of executing the calibration process of newly creating a database file according to the characteristic of the image formation unit on the basis of an original database file according to the kind of the image formation unit, and of storing the created database file in correspondence with the characteristic of the image formation unit, wherein version information of the original database file is compared with version information of the created database file, and the execution of the calibration process is controlled based on the compared result.

5 Claims, 5 Drawing Sheets

IMAGE PROCESSING METHOD, PROGRAM THEREOF AND IMAGE PROCESSING APPARATUS

BACKGROUND OF THE INVENTION

1. Field of the Invention

The present invention relates to a method of executing a calibration process in accordance with a characteristic of an image formation unit.

2. Related Background Art

For example, in a case where image data synthesized by a personal computer are output by a printer, brightness signals of R (red), G (green) and B (blue) composing the above image data have to be color-converted into color signals of Y (yellow), M (magenta) and C (cyan), and further of K (black) if necessary. In such the color conversion, a relationship in general between an input color space based on the brightness signals and an output color space based on the color signals is nonlinear. Therefore, in the data conversion, if the correspondence between the input data and the output data is nonlinear as above, it is not easy to create an exact model of such the conversion and perform calculation based on the created model. Further, even if a certain model of the conversion can be created, a calculation amount required in this conversion might become enormous. Therefore, to solve such a problem of the data conversion, there has been known a method of easily performing data conversion by previously creating an LUT (look-up table) of which the output data respectively correspond to the input data.

Incidentally, the previously obtained LUT is only different in each printing mode, whereby the same kind of printers always use the same LUT regardless of conditions based on heads, printers and the like.

However, even if the previously created LUT is used, the optimum printed result is not always obtained due to individual differences of the printer main bodies, the ink heads and the like. For example, if magenta is set to be intense on the LUT, the image obtained by using this LUT becomes reddish as a whole, whereby a gray balance might not be able to be maintained.

SUMMARY OF THE INVENTION

In consideration of such a problem as described above, an object of the present invention is to create and administrate an image processing condition in correspondence with individual differences of image formation units.

Another object of the present invention is to effectively perform creation of the image processing condition according to the individual differences of the image formation units, that is, to properly judge necessity of the creation of the image processing condition, and also prevent the unnecessary creation of the image processing condition.

In order to achieve the above objects, the present invention provides an image processing method of executing an image process, according to an image formation unit, by using an image processing condition stored in a database file, the method comprising the steps of: executing a calibration process to newly create a database file according to a characteristic of the image formation unit on the basis of an original database file according to a kind of image formation unit; storing the created database file in correspondence with the characteristic of the image formation unit; comparing version information of the original database file according to the kind of image formation unit with version information of the database file created in correspondence with the characteristic of the image formation unit, when execution of the calibration process is instructed; executing the calibration process by using the original database file according to the kind of image formation unit in a case where the version information of the original database file does not correspond to the version information of the created database file; and not executing the calibration process in a case where the version information of the original database file corresponds to the version information of the created database file.

DETAILED DESCRIPTION OF THE PREFERRED EMBODIMENTS

Hereinafter, the embodiments of the present invention will be explained with reference to the attached drawings.

Figure 1:
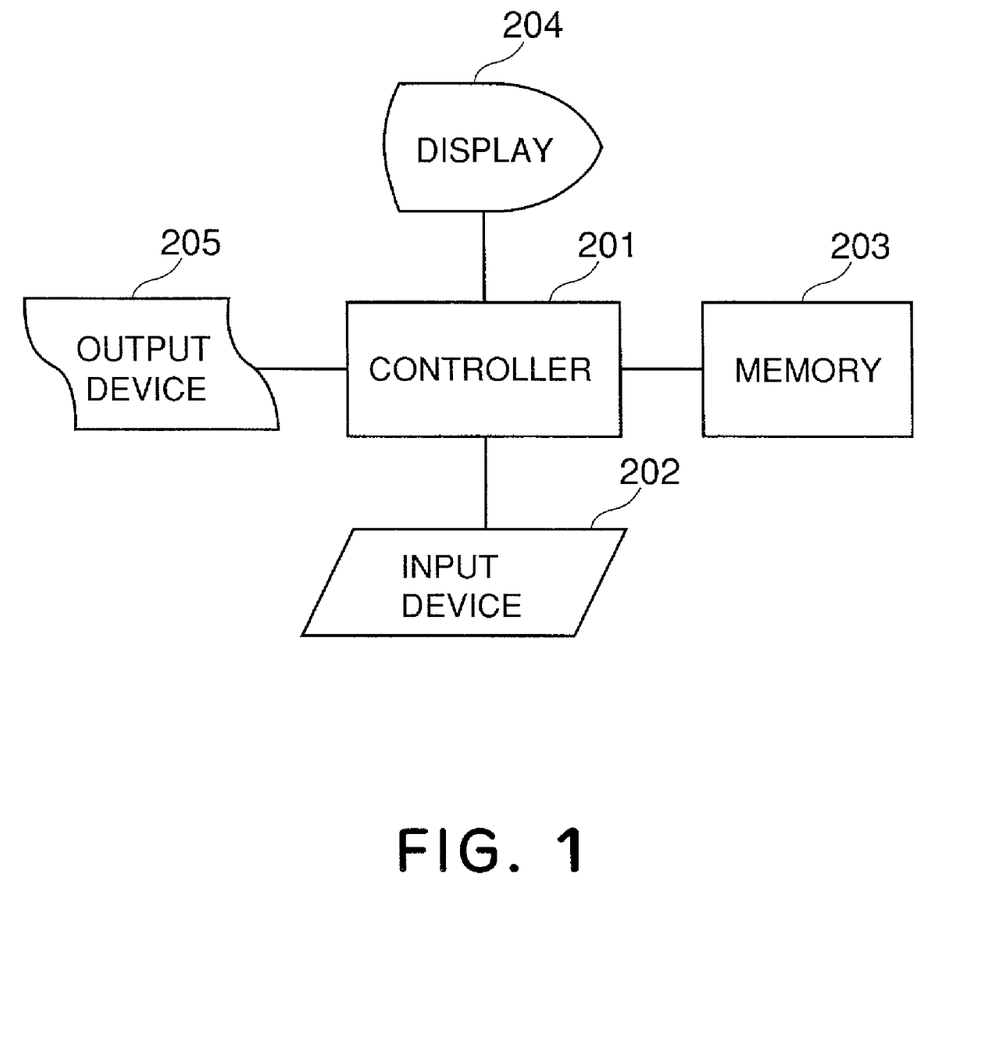
FIG. 1 is a block diagram showing the structure of an image processing system.

FIG. 1 is a block diagram showing the structure of an image processing system being one embodiment of a data conversion apparatus.

An output device 205 which can adapt, e.g., a color printer performs a color print output on a print sheet by ejecting four-color inks of yellow (Y), magenta (M), cyan (C) and black (K) from a print head. The number of output colors of the color printer may be six or seven, however, the explanation will be given by the above four colors in the present embodiment. Print data which is composed of density data of Y, M, C and K used in the output device 205 can be obtained according to an image process executed by a controller 201. The image process includes color correction, color conversion, gradation correction and a quantization process explained as below.

The controller 201 which has a CPU executes a data process regarding this system such as the later-described color conversion and its initial process, or operation control of each mechanical element. A memory 203 is composed of memories (a ROM (read-only memory), a RAM (random-access memory), etc.), a hard disk, external memories (a floppy disk, etc.) and the like, as a whole. Besides, the memory 203 stores an LUT (look-up table) and a calculation category (described later).

For example, image data read by a scanner is stored in the memory 203, and an operator of this system executes a desired process or the like to an image displayed on a display 204 such as a CRT (cathode ray tube) by an input operation from an input device 202 composed of a keyboard, a mouse and the like, whereby an image to be print and output by the output device 205 can be formed.

As above, the image formed by this system is generally represented by gradation data for brightness signals R, G and B. Since the gradation data is to be treated as print data of the output device 205, the color correction, the color conversion, the gradation correction and the quantization process mentioned above are executed.

It is quite obvious that application of the present invention is not limited to the above system. For example, it has been known that a color conversion process is executed in an apparatus such as a copying machine or the like, and it is also quite obvious that the present invention can be applied to such the apparatus or system.

With respect to a color correction process, the color correction from eight-bit data for each of R, G and B to eight-bit data for each of R', G' and B' is executed. With respect to a color conversion process, the color conversion from eight-bit data for each of R', G' and B' to eight-bit data for each of C, M, Y and K is executed. With respect to a gradation correction process, the correction from eight-bit data for each of C', M', Y' and K' to eight-bit data for each of C", M", Y" and K" is executed. With respect to the quantization process, the quantization from eight-bit data for each of C", M", Y" and K" to one-bit data for each of C, M, Y and K is executed. The color correction, the color conversion, the gradation correction and the quantization process are executed by utilizing the LUT.

Figure 2:
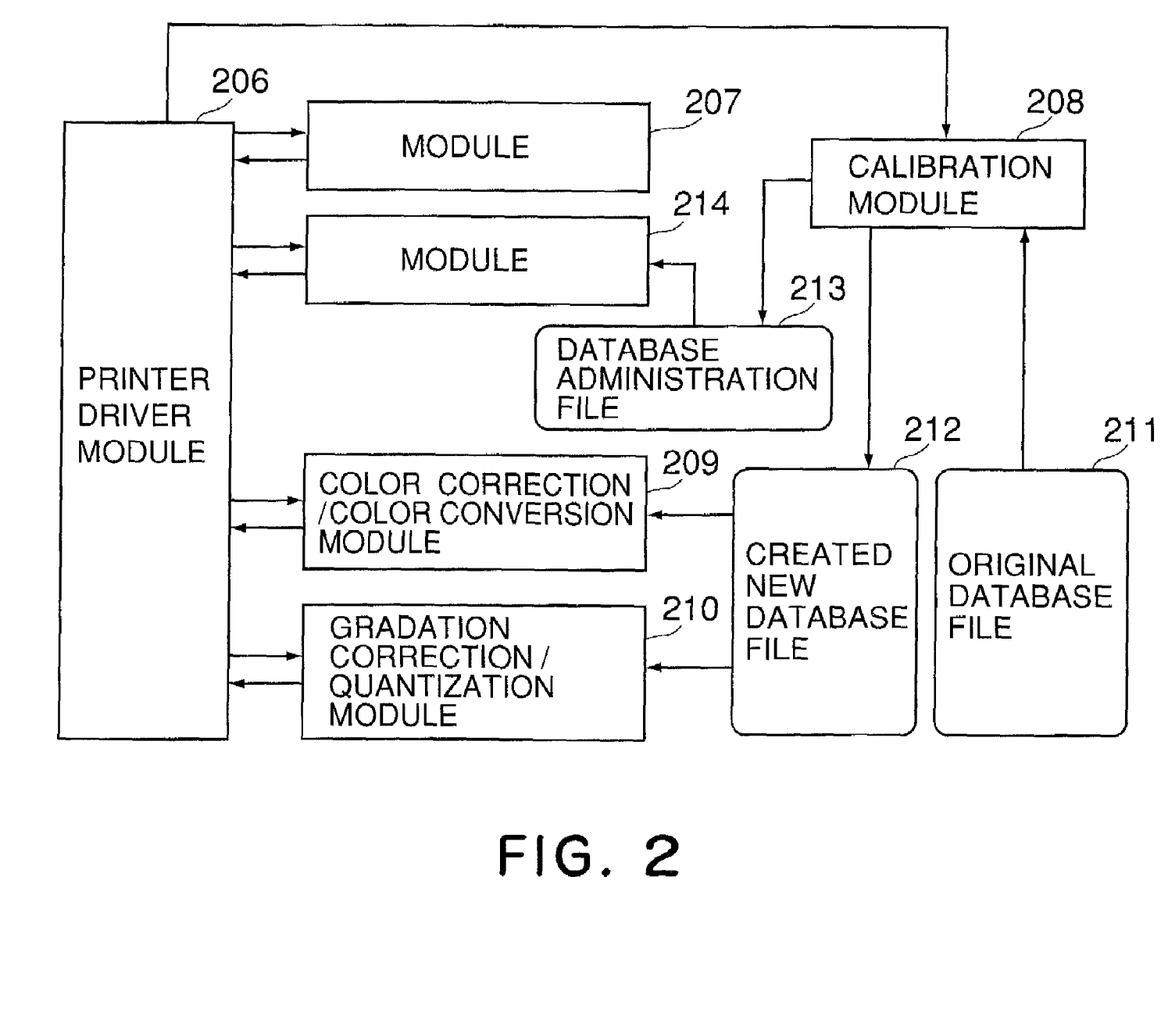
FIG. 2 is a view showing the conception of a calibration process.

FIG. 2 is a conceptional view of an administration method of a database file including the LUT.

A printer driver module main body 206 newly creates a database file 212 on the basis of an original database file 211 calling a calibration module 208. A starting method of calibration may be performed in accordance with a user's instruction from a driver utility, or may be performed when a print start command is issued, a driver program is installed, or a print head is exchanged.

Figure 3:
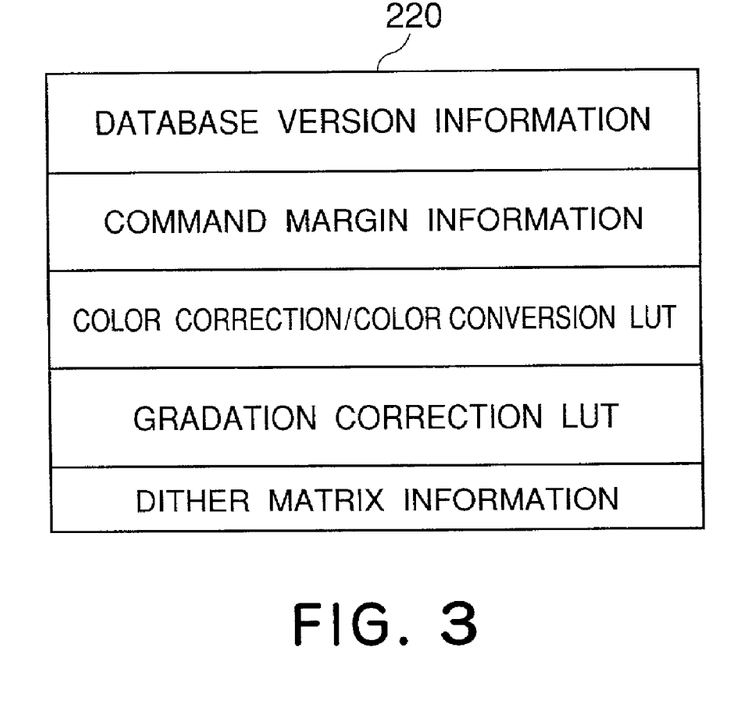
FIG. 3 is a view showing the structural conception of an original database file.

The original database file 211 which is equivalent to a database 220 corresponding to the kind of printer shown in FIG. 3 includes an image processing condition such as a command or margin information being device information, an LUT (an interpolation table) necessary for the color correction and the color conversion, an LUT (a gradation correction table) necessary for the gradation correction process, dither matrix information necessary for the quantization process, and the like.

Figure 5:
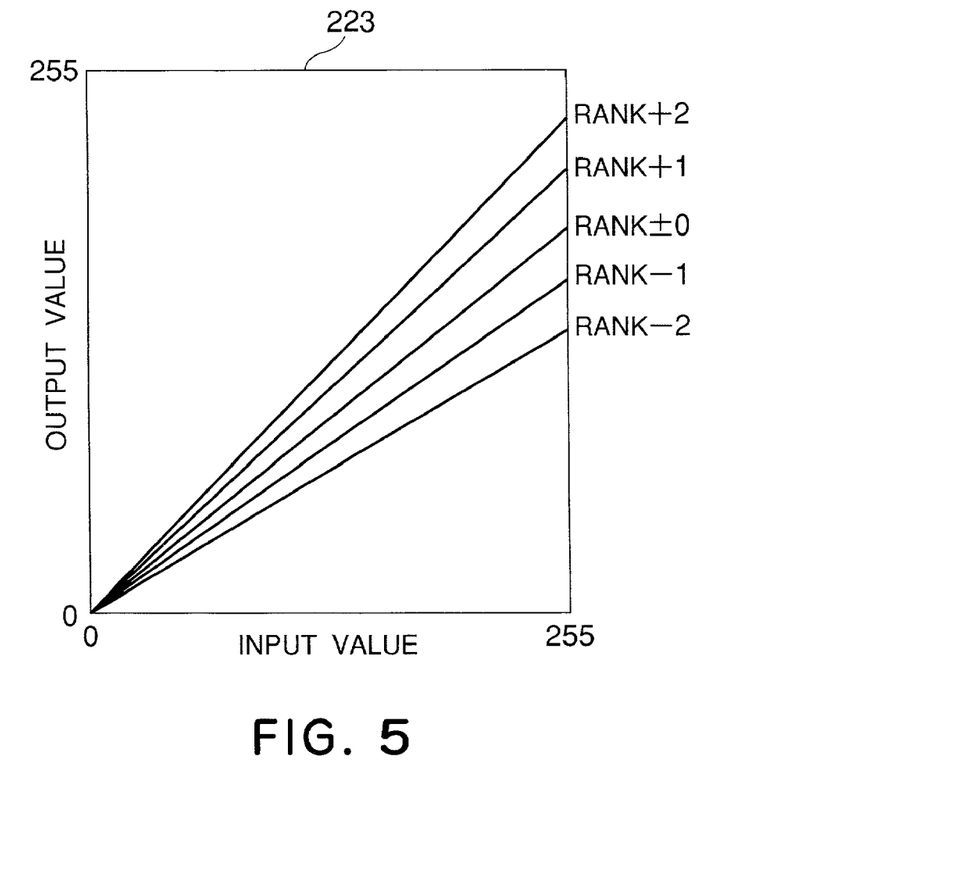
FIG. 5 is a view showing the conception of adjusting an LUT of a gradation correction table in accordance with a head rank.

A calibration process is such a process of creating a database file corresponding to a characteristic of the printer. For example, a printer driver captures information (print head discrimination information) indicating the characteristic of the printer and head rank information (information indicating a characteristic of a head denoted by, e.g., C:+2, M:0, Y:−1, K:+1) from the printer main body, and notifies those information to the calibration module, thereby creating a database file including an LUT (gradation correction table 223 in FIG. 5) fitted to a head rank. It should be noted that plural LUT's corresponded to each rank are held beforehand.

Figure 4:
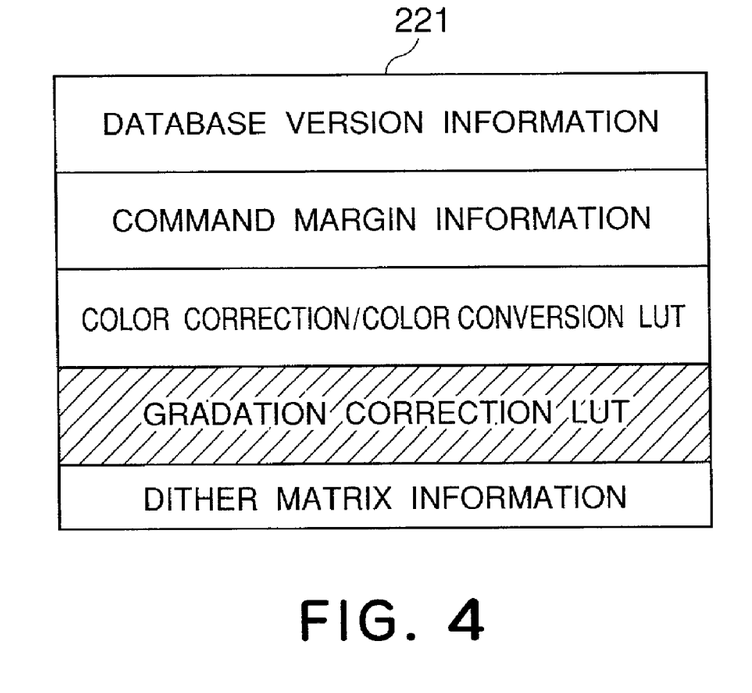
FIG. 4 is a view showing the structural conception of a new database file.

An example of a new database file created in accordance with the head rank information is shown in FIG. 4. With respect to the calibration process according to the head rank, since the gradation correction table is created, the original database file differs from the new database file only in the gradation correction table.

Figure 6:
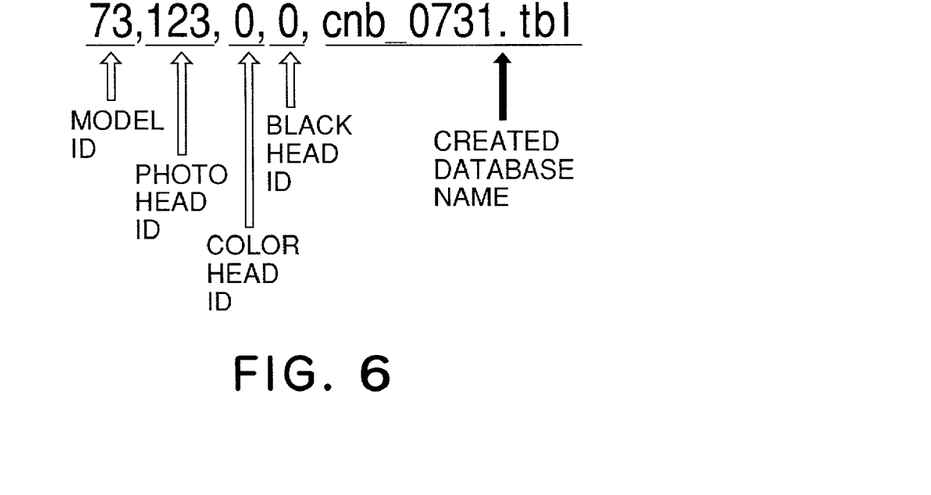
FIG. 6 is a view showing format of a database administration file in a printer coping with one head.

The calibration module creates the new database file and simultaneously creates a database administration file 213 used for administrating or managing the new file as in FIG. 6. The database administration file 213 is distinguished from an image processing module database file as another file and is used for giving correspondence between a head ID and a new database table name. In a case where a new head is mounted, a head ID corresponding to the new head and a new database name corresponding to the head ID have to be additionally registered to the database administration file 213.

An example of an administration file of a printer coping with one head (e.g., photo head) capable of mounting only one head is shown in FIG. 6. A printer to which the administration file is corresponded can be specified according to the combination of a model ID and the head ID. Further, database creation order information is added to a database name, by which the creation order of a database file created for the same printer can be recognized.

Next, the printer driver module 206 calls a module 207 in order to obtain an original database file name corresponding to the kind of printer.

Further, the printer driver module calls a module 214 in order to obtain a database file name created corresponding to the kind of head mounted on the printer by the calibration process. The module 214 obtains a database file name corresponding to the head ID from the database administration file 213 and notifies that file name to the printer driver module.

The printer driver module executes an image process of utilizing the LUT stored in the database file corresponding to the mounted head by calling a color correction/color conversion module 209 and a quantization/gradation correction module 210 by the obtained database file name.

In the present embodiment, since the calibration process corresponding to the head rank is executed, head ranking information does not vary during the same head is used, whereby the calibration process has not to be executed again. Therefore, in a case where the head ID corresponding to the head mounted on the printer when the calibration is instructed is coincident with a head ID held by the latest database file already created, the calibration process is not executed in order to suppress the time spent on the calibration.

However, in the present embodiment of performing the above control, there occurs the following problem in case of version up of the printer driver.

If the version of the printer driver comes to be differed, support media (media previously assumed to be used in a printer) of the driver are added, or image processing parameters are changed. As a result, there sometimes occurs a case that a proper image process can not be executed by using the LUT of the former version printer driver.

If the calibration process is executed by the former driver and the version up of the printer driver is performed with a state of remaining the created database file 212 and the database administration file 213, the database file created by the former version driver remains. As a result, there occurs a case that a correct output result can not be obtained by the database file created for the former version driver in spite of using a version-up printer driver.

Figure 7:
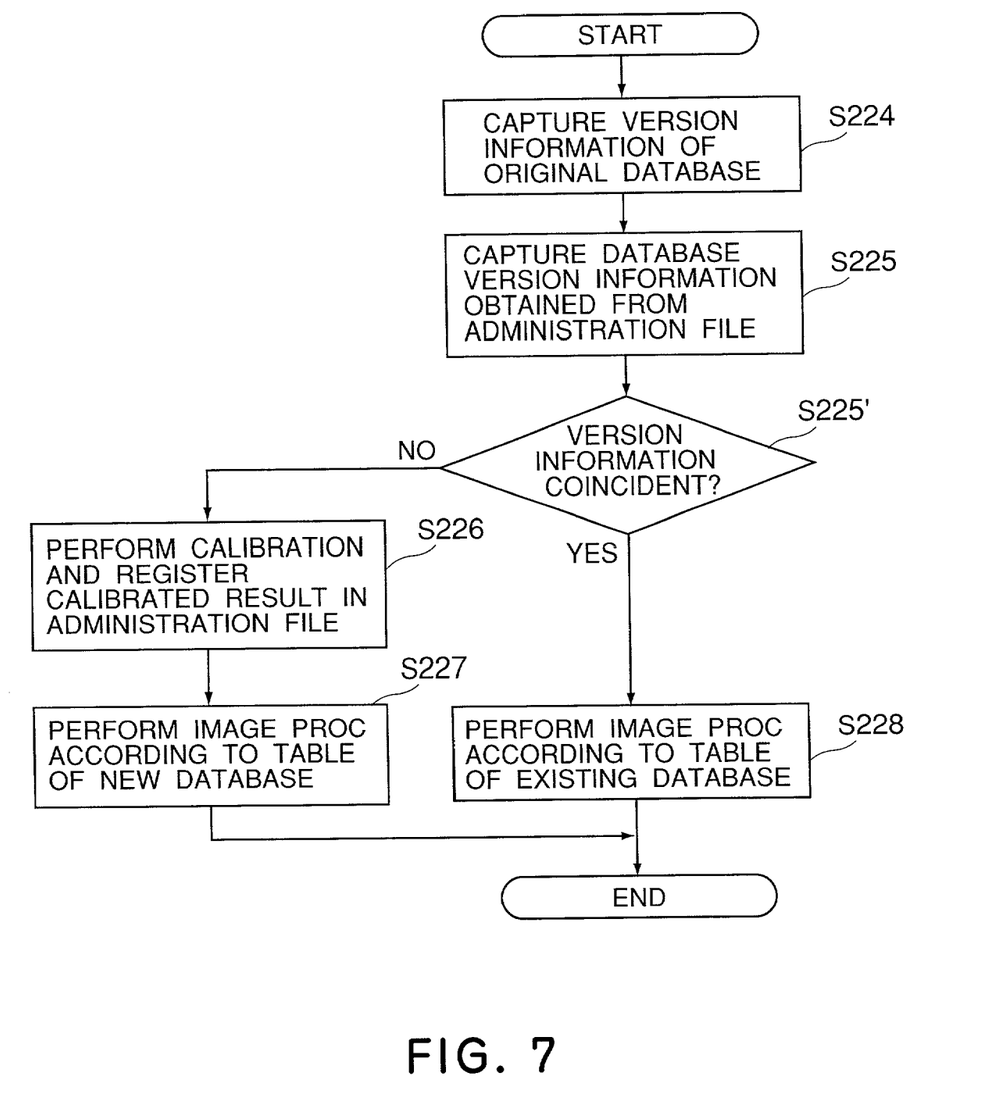
FIG. 7 is a flow chart of controlling the calibration process.

Consequently, the present embodiment solved the above problem by executing a process indicated in FIG. 7, when the calibration module 208 is called.

First, when the calibration module 208 is called, an original database file name of a new driver is obtained from the module 207. Then, database version information stored in the original database file (FIG. 3) is captured (S224).

Further, the module 214 is called, and a latest database file name corresponding to the head ID stored in a database file name administration file is obtained. Then, database version information stored in the latest database file (FIG. 4) is captured (S225).

Next, database version information in the original database file of the new driver is compared with the database version information in the latest database file (S225').

When the version information are not coincident, the calibration process is executed on the basis of the original database file of the new driver to register the calibrated result in the administration file, then an image process is executed using that database file to perform a printing operation (S226 and S227 in FIG. 7).

On the other hand, when the version information are coincident, the image process is executed using the existing database file to perform the printing operation (S228 in FIG. 7).

In a case where it is changed not to support the calibration process when the version up of the driver is performed, a version meaning nonsupport is assigned to the version information of the original database file, and if the original database file is set to be equivalent to the new database file, an output result to which the calibration process is not executed is obtained. According to this constitution, e.g., in case of executing the calibration process in a state of increasing the ink ejection amount due to the elapse of time, there rarely occurs such a case of further increasing the ink ejection amount according to the calibration process. However, this problem can be solved by not executing (or inhibiting) the calibration process itself.

According to the present embodiment, a proper database file can use in the image process by previously incorporating the version information in the original database file and the created database file and controlling execution of the calibration process on the basis of such the version information.

Furthermore, when the version information are coincident, since the calibration process is not executed, execution of the unnecessary calibration process can be prevented.

(Other Embodiment)

The present invention also includes a case of supplying the program codes of a software for realizing the functions of the above embodiment through a network.

In this case, the program codes themselves of the software are to realize the functions of the above embodiment, and the program codes themselves and a means for supplying the program codes to a computer constitute the present invention.

It is needless to say that the program codes are included in the embodiment of the present invention not only in a case where the computer executes the supplied program codes and the functions of the above embodiment are realized, but also in a case where the program codes cooperate with an OS (operating system) functioning on the computer, another application software or the like and the functions of the above embodiment are realized.

According to the above constitution, an image processing condition according to the individual difference in an image formation unit can be effectively created. That is, it becomes possible to properly judge a fact that the creation of the image processing condition is necessary, and prevent the unnecessary creation.

What is claimed is:

1. An image processing method for controlling an image processing apparatus to execute a calibration process to create a new database file, including a gradation correction table according to a characteristic of an image formation unit on the basis of an original database file according to a kind of image formation unit, said method comprising the steps of:
    comparing, in an upgraded version of a printer driver for the image processing apparatus, version information in an original database file of the version-upgraded printer driver with version information in the new database file; and
    executing the calibration process, for forming the gradation correction table, by using the original database file of the version-upgraded printer driver in a case where the version information in the original database file of the version-upgraded printer driver does not correspond to the version information of the new database file,
    wherein the calibration process is not executed in a case where the version information of the original database file of the version-upgraded printer driver corresponds to the version information of the new database file, and
    wherein the execution of the calibration process is managed according to discrimination information of a print head used in said image formation unit.

2. A method according to claim 1, wherein there is a mode of not supporting the calibration process in the upgraded version of the printer driver.

3. A method according to claim 1, wherein the image formation unit performs image formation by using a print head of the image processing apparatus, and the characteristic of the image formation unit is equivalent to a head rank of the print head of the image processing apparatus.

4. A storage medium storing a program for executing an image processing method to control an image processing apparatus by executing a calibration process to create a new database file, including a gradation correction table according to a characteristic of an image formation unit on the basis of an original database file according to a kind of image formation unit, said program comprising:
    code for comparing, in an upgraded version of a printer driver for the image processing apparatus, version information in an original database file of the version-upgraded printer driver with version information in the new database file; and
    code for executing the calibration process, for forming the gradation correction table, by using the original database file of the version-upgraded printer driver in a case where the version information in the original database file of the version-upgraded printer driver does not correspond to the version information of the new database file,
    wherein the calibration process is not executed in a case where the version information in the original database file in the version-upgraded printer driver corresponds to the version information of the new database file, and
    wherein the execution of the calibration process is managed according to discrimination information of a print head used in said image formation unit.

5. An image processing apparatus executing a calibration process to create a new database file, including a gradation correction table according to a characteristic of an image formation unit on the basis of an original database file according to a kind of image formation unit, said apparatus comprising:
    control means for comparing, in an upgraded version of a printer driver for said image processing apparatus, version information in an original database file of the version-upgraded printer driver with version information in the new database file of the version-upgraded printer driver with version information of the new database file; and execution means for executing the calibration process, for forming the gradation correction table, by using the original database file of the version-upgraded printer driver in a case where the version information in the original database file of the version-upgraded printer driver does not correspond to the version information of the new database file, wherein the calibration process is not executed by said execution means in a case where the version information in the original database file in the version-upgraded printer driver corresponds to the version information of the new database file, and wherein the execution of the calibration process is managed according to discrimination information of a print head used in said image formation unit.

* * * * *

UNITED STATES PATENT AND TRADEMARK OFFICE
CERTIFICATE OF CORRECTION

PATENT NO. : 7,194,476 B2
APPLICATION NO. : 10/094715
DATED : March 20, 2007
INVENTOR(S) : Nagatani It is certified that error appears in the above-identified patent and that said Letters Patent is hereby corrected as shown below:

COLUMN 1:
Line 23, "the" should read -- a --.

COLUMN 2:
Line 66, "print" should read -- printed --.

COLUMN 3:
Line 12, "the" should read -- an --;
Line 52, "those" should read -- that --; and
Line 55, "corresponded" should read -- corresponding --.

COLUMN 4:
Line 10, "is corresponded" should read -- corresponds --;
Line 32, "during" should read -- while --; and
Line 44, "differed," should read -- changed, --.

COLUMN 5:
Line 31, "use" should read -- be used --;
Line 34, "such the" should read -- such --; and Signed and Sealed this Eighteenth Day of March, 2008

JON W. DUDAS
*Director of the United States Patent and Trademark Office*